US010153626B2

(12) United States Patent
Berg (10) Patent No.: US 10,153,626 B2
(45) Date of Patent: Dec. 11, 2018

(54) SUBSEA CABLE INSTALLATION UNIT (75) Inventor: Arne Berg, Kattem (NO)

(73) Assignee: OPTOPLAN AS, Tiller (NO)

( * ) Notice: Subject to any disclaimer, the term of this patent is extended or adjusted under 35 U.S.C. 154(b) by 0 days.

(21) Appl. No.: 13/447,960

(22) Filed: Apr. 16, 2012

(65) Prior Publication Data

US 2012/0263540 A1 Oct. 18, 2012

(51) Int. Cl.
*H02G 1/10* (2006.01)
*G02B 6/50* (2006.01)
*H02G 9/02* (2006.01)

(52) U.S. Cl.
CPC ............... *H02G 1/10* (2013.01); *G02B 6/506* (2013.01); *H02G 9/02* (2013.01)

(58) Field of Classification Search
CPC . H02G 1/10; H02G 9/02; G02B 6/506; B23G 2008/007
USPC .... 405/158, 166, 168.1, 168.3, 168.4, 184.4
See application file for complete search history.

(56) References Cited

U.S. PATENT DOCUMENTS

| | | | | | |
|---|---|---|---|---|---|
| 3,365,823 | A | * | 1/1968 | Vogt | 37/314 |
| 3,512,367 | A | * | 5/1970 | McLallen, Jr. | 405/171 |
| 3,687,418 | A | * | 8/1972 | Halvorsen | 254/279 |
| 3,715,068 | A | * | 2/1973 | Clarke | B65H 51/10 226/108 |
| 4,313,694 | A | * | 2/1982 | Cox | 405/168.1 |
| 4,324,195 | A | * | 4/1982 | Cunningham | B63C 11/48 114/312 |
| 4,624,645 | A | * | 11/1986 | Kiely et al. | 441/4 |
| 4,686,927 | A | * | 8/1987 | Hawkes | B63C 11/52 104/173.1 |
| 4,927,294 | A | * | 5/1990 | Magnani et al. | 405/177 |
| 5,380,129 | A | * | 1/1995 | Maloberti et al. | 405/166 |
| 5,485,973 | A | * | 1/1996 | Nellessen, Jr. | B65H 57/20 114/312 |
| 5,624,207 | A | * | 4/1997 | Berges | 405/173 |
| 5,902,072 | A | * | 5/1999 | Berges | 405/173 |
| 6,113,312 | A | | 9/2000 | Noerholmen | |
| 6,276,625 | B1 | * | 8/2001 | Chee | G06Q 40/04 114/312 |
| 6,350,085 | B1 | * | 2/2002 | Bath | G02B 6/506 405/154.1 |
| 7,507,055 | B2 | * | 3/2009 | Smith et al. | 405/173 |

(Continued)

FOREIGN PATENT DOCUMENTS

| | | |
|---|---|---|
| EP | 0 338 482 | 10/1989 |
| EP | 0 431 279 | 6/1991 |

(Continued)

*Primary Examiner* — Jessica H Lutz
(74) *Attorney, Agent, or Firm* — Tong, Rea, Bentley & Kim, LLC (57) ABSTRACT

A subsea installation tool for installing a flexible body, e.g. a subsea fiber cable on a seabed from a surface vessel, and an associated method for installing the flexible body on the seabed is provided. The installation tool includes a tensioner that may be coupled to the flexible body to actively pull it down, thus increasing tension in an upper section of the cable from the installation vessel to the installation tool. High tension in the upper part of the cable gives good control even in strong sea currents. At the same time the tensioner enables lower tension in the bottom part cable from the installation tool to the seabed, giving good control of the touchdown position on the seabed.

19 Claims, 4 Drawing Sheets

(56) References Cited

U.S. PATENT DOCUMENTS

| | | | |
|---|---|---|---|
| 8,616,805 B2 * | 12/2013 | Hawkes | B63C 11/52 |
| | | | 405/154.1 |
| 2002/0172562 A1 | 11/2002 | Worman et al. | |
| 2007/0081862 A1 * | 4/2007 | Wolbers et al. | 405/169 |
| 2009/0087267 A1 * | 4/2009 | Narold et al. | 405/166 |
| 2011/0217123 A1 * | 9/2011 | Jewell | F16L 1/16 |
| | | | 405/158 |

FOREIGN PATENT DOCUMENTS

| | | |
|---|---|---|
| GB | 2 242 788 | 10/1991 |
| NO | 176686 | 1/1995 |

* cited by examiner

SUBSEA CABLE INSTALLATION UNIT

CROSS-REFERENCE TO RELATED APPLICATIONS

This application is a claims priority from European Patent Application No. 11162552.1, filed Apr. 15, 2011, which is hereby incorporated herein in its entirety.

FIELD OF THE INVENTION

The present invention relates to devices and methods for placing an elongate object such as a cable at the ocean bottom. More particularly, the present invention is related to the deployment of an ocean bottom seismic cable from a surface vessel and to the ocean bottom. Even more particularly the present invention is related the deployment of ocean bottom cables at large sea depths.

BACKGROUND OF THE INVENTION

Norwegian Patent No. 176686 describes devices for installing sea cables or other elongated objects at the bottom of the sea from a cable ship. It is in particular described how the geographical coordinates for the touchdown point (TDP) may be determined for a cable during its installation using a touchdown point follower which comprises navigational devices.

U.S. Pat. No. 6,113,312 describes how a local remote operated vehicle (ROV) may be used during the installation of an elongate element, such as a submarine cable, on the seabed. A guide weight tracking gear is suspended from a ship and rides on the elongate element. The gear includes a garage for hosting a local ROV. The problem of obtaining the TDP is solved by using a local ROV for observing the TDP.

The present inventors have experienced that while installing a cable at large depths while being subjected to strong sea currents the cable can drift off out of control. The dynamic behaviour or the cable at the sea bottom represents a high risk of cable damage. A further risk is associated with a possible tangle of the cable with the ROV umbilical or other vertical elements, particularly if operated from the same vessel.

In European patent application publication number EP 0431279 A1 there is proposed a cable guiding means with a weight large enough to secure a substantially vertical position relatively to a laying vessel, when the actual sea currents and depth conditions are taken into consideration. The guide weight (GW) is attached to the installation vessel by wires. The wire may support an umbilical for carrying control signals and power for electronic instrumentation included in the guiding means. The electronic instrumentation may include observation, navigation and communication functions. Thrusters or a rudder may manoeuvre the GW subsea.

The advantages of using a guide weight compared to an ROV are strength and simplicity. Vertical movements are controlled by a winch on the vessel, so the GW therefore has high lifting capacity as compared to an ordinary ROV. The downward vertical force may also be made large compared to most ROVs which typically are buoyant. The GW has no need for buoyancy and there is no need for thrusters to control vertical movements. The major parts of the horizontal movements are controlled by the vessel.

A GW umbilical is strong and drag displacements are limited due to the weight of the wire and the GW itself. There is no requirement for umbilical buoyancy as for an ROV umbilical. The GW may therefore also be used for lifts to reduce the use of a crane/winch or save some time by parallel installation/retrievals.

The GW defines a "fixed" point following the vessel movements close to the sea bottom. However, the cable to be installed must be controlled all the way from top to bottom to eliminate the risk of tangling.

In EP 0431279 A1 it is proposed to guide the cable through rings attached between the two vertical wires. The limitation of such a solution is that the cable is trapped to the installation tool all the way from top to bottom. This concept is most suitable when the cable is installed from one shore to the other. Discontinuities such as a sensor station on a seismic cable may be expected to represent a problem when passing the rings.

Another option is to increase the tension in the cable so that it becomes almost parallel with the GW wire, as presented in U.S. Pat. No. 6,113,312. The excess loop of cable due to sea currents will then be strongly reduced. A limitation of a high tension in the cable is that the touchdown point (TDP) will typically be far behind the GW, making it more complicated to observe the TDP, and the GW will be pulled backwards with respect to the vessel. The dynamic movements of the vessel due to weather (primarily waves) will make the position of the GW and TDP move quite a lot in rough water.

Although the prior art presents significant progress in the area of installing cables on the seabed, there are still limitations, in particular related to installation in deep waters with strong sea currents and rough seas.

Hence, a device and method that increase the reliability and efficiency of the deployment of a subsea cable would be advantageous, and in particular devices and methods for more efficient and/or reliable control of the cable during deployment at the sea bottom would be advantageous.

OBJECT OF THE INVENTION

It is an object of the invention to provide a cable installation device that increases the reliability and efficiency of deployment of a flexible elongate object from a vessel to a subsea location.

It is a further object of the invention to provide a method of installing a subsea cable on the seabed using the installation device of the invention in a reliable and efficient manner that will ensure good control during deployment on the seabed.

If a cable with or without sensor stations are to be trenched it will be required to use a good trenching technique. Thus it is an object of some embodiments of the invention to also provide for a reliable and efficient trenching operation.

In particular, it may be seen as an object of the present invention to provide an installation device and an installation method that solves the above mentioned problems of the prior art with regard to sea currents and drag effect on the cable when being deployed.

It is a further object of the present invention to provide alternatives to the prior art.

SUMMARY OF THE INVENTION

The above objects and several other objects are intended to be obtained in a first aspect of the invention by providing a subsea installation tool for installing a flexible body, such as a subsea fibre cable on a sea bed from a surface vessel.

The tool comprises a main body suspended from the vessel using an umbilical and having a mass and density sufficient to create a downward force in the umbilical. Cable guiding means are provided on the main body. The installation tool is characterised by a tensioner couplable to the flexible body, e.g. by clamping, to actively pull down the flexible body. Thereby tension in a first (upper) section of the flexible body from the installation vessel to the installation tool can in a controlled manner be made larger than the tension in a second (bottom) section of the flexible body from the installation tool to a touchdown position of the flexible body on the sea bed.

The flexible body will throughout this text be exemplified by a subsea fibre cable. However, other types of flexible bodies, such as electrical cables, flexible pipes or tubes may also be installed with the installation tool according to the invention. Thus, expressions such as "cable tension", "cable touchdown position", etc. are to be understood as the tension, or touchdown position, respectively, of the specific flexible body in question, i.e. not limited to the case of cables.

By using a tensioner to actively pull down the flexible body it is possible to have a high tension in the almost vertical part of the flexible body between the deployment vessel and the installation tool with the tensioner, while at the same time having significantly lower tension, as exemplified below, in the part of the flexible body between the installation tool and the touchdown point. Both are particularly important at large water depths with strong sea currents where the final tension in the installed flexible body should be low.

The cable guiding means may comprise the tensioner and may optionally comprise one or two chutes.

In example embodiments of the installation tool according to the invention the tensioner is coupled to a control unit on the surface vessel. The tensioner and other parts of the installation tool may for example be coupled to the vessel, e.g. being connected via first power transmission and communication means. Such first power transmission and communication means will most likely be included in the umbilical suspending the installation tool. Advantageously, this makes it possible to control the tensioner via a single umbilical, thereby reducing the number of umbilicals/cables hanging down from the vessel to a minimum, thus also reducing the possibilities for entanglement of such umbilicals/cables.

In example embodiments of the installation tool according to the invention the tensioner comprises one or more wheels clampable onto the flexible body. Clamping the flexible body in the tensioner on the installation tool makes it possible to control the tension in a first (upper) part of the flexible body in a reliable manner. At least one of the wheels is movably mounted, for example onto the main tool body, so as to open a part of the tensioner for allowing entering and releasing of the flexible body in the tensioner. This way the flexible body may both be attached to the installation tool and released from the installation tool in a controlled manner, even in a subsea location. Being able to release the installation tool from the flexible body increases the operational flexibility of the deployment operation, as it is then possible to use the installation tool also for additional and/or supplementary functions, for example prior to or after the deployment operation itself.

One or more of the wheels may be arranged, e.g. on a translating element, for moving one or more of the wheels along a generally linear trajectory, so as to create an opening in the tensioner, the opening being dimensioned to the diameter of the flexible body for moving the flexible body into or out of the tensioner/chutes.

Alternatively, one or more of the wheels may be arranged on a pivoting element so as to provide a rotational/circular movement of the one or more wheels so as to create an opening along the chute in the tensioner, the opening being dimensioned to the diameter of the flexible body for moving the flexible body into or out of the tensioner.

Example embodiments of the installation tool according to the invention may be provided with a closable slot in parallel with and coupled with the chute so as to allow the flexible body to be entered into or removed from the tensioner in a well-defined manner. For being able to open and close the slot, there may be provided a movable element, e.g. a movable wall of the chute.

In some embodiments of the installation tool according to the invention the tensioner comprises a caterpillar element. By using a caterpillar element the clamping force is distributed between a number of contact points between the tensioner and the flexible body, thus reducing the load on each contact point as compared to when using a single/double wheel to clamp onto the flexible body.

In further embodiments of the installation tool according to the invention a part of the tool is releasable, to enable releasing it from the main part of the tool and placing it on the sea bed, thus leaving it to act as an anchor for the flexible body being installed. Providing such an anchor assists in ensuring control of the placement of the flexible body on the sea bed as well as the vertical section, as a secure fixed point on the sea bed will be defined by the left anchor. The releasable part may comprise a gripping mechanism for gripping the flexible body, for example in the form of a clamp device. The gripping mechanism may be a part or all of the tensioner that is attached to the releasable part of the tool.

For increasing the stability when parking or leaving a part of the guiding means on the seafloor, in embodiments of the installation tool according to the invention the installation tool is provided with one or more elements of a group of elements consisting of: one or more spears, one or more cross bars, or one or more mud plates.

In embodiments of the installation tool according to the invention there is provided also a trencher which is releasably coupled to the guiding means. In this way a trencher may be lowered down to the appropriate sea depth together with the guiding means, thus effectively reducing the number of required steps if a trenching of the flexible body and/or sensor stations is required.

The trencher may in some embodiments of the installation tool be locked onto a base frame which can be locked vertically.

Embodiments of the installation tool station according to the invention comprises second power transmission and communication means for supplying power to the trencher and communication means for communicating with the trencher, advantageously along the single umbilical from the surface vessel to the tensioner.

For obtaining low influence of the pulling function on the position of the installation tool, embodiments of the installation tool according to the invention comprises a main body with one or more loads giving a total tension in the umbilical of the installation tool that is typically several times or more than the tension pulling down the flexible body. This way the counterforce on the installation tool from the flexible body running towards the vessel is smaller than the forces in the umbilical (in the suspension wires). This means that the installation tool continues to remain suspended mainly from the suspension wires, even though some tension is moved to the flexible body by the pulldown function.

By providing a tensioner that actively pulls down the flexible body to be installed, the problem of wide and swifting catenaries that could generate entanglement with other vertical lines is almost eliminated. The tensioner may be controlled so as to ensure an optimum tension. The optimum tension is a compromise between the maximum tension possible in the flexible body to hold it as much as possible in position, without compromising the function of the installation tool or risking breakage of the flexible body. Obviously, it will not be possible to maintain the flexible body in a perfect vertical line, however, it is useful to maintain the flexible body as straight as possible in the upper, vertical section of the catenary (the path of the flexible body) while ensuring a low tension in the catenary towards the touchdown position (TDP). Low tension in the catenary towards the TDP is attractive as this serves to obtain the desirable feature of low tension in the installed flexible body. Good control of the horizontal catenary also makes it possible to place the installation tool close to the sea bed, thus enabling a reduction in the flexible body length from the installation tool to the TDP. It is then easier to operate/control a trencher that is connected to the installation tool, because the necessary length of trencher cable may then be kept as low as possible.

The objects of the invention are also intended to be obtained in a second aspect of the invention where there is provided a method for installing a flexible body, such as a subsea optical fibre cable, at the sea bed, the method comprising the step of pulling a part of the flexible body during deployment or retrieval of the flexible body with an installation tool according to any of the embodiments of the installation tool according to the invention. Advantageous properties of the method are similar to the advantageous properties of the installation tool as mentioned in this description.

In embodiments of the method according to the second aspect of the invention a trencher is maintained as a fixed part of the installation tool during deployment and retrieval of the installation tool. This has the advantage that the trencher does not have to be deployed or retrieved using separate means and/or in separate operational steps. The single/common umbilical to the installation tool eliminates the need for an additional umbilical to the trencher.

In embodiments of the method according to the invention the trencher is released from the installation tool, moved to a sea bed where a flexible body and/or station is to be trenched. At this position the trencher prepares a trench in the seabed for the flexible body and/or stations.

In embodiments of the method according to the second aspect of the invention a trencher is used to place the flexible body and/or stations into the seabed, for example by pressing or wiggling the stations into the seabed.

Embodiments of the method according to the second aspect of the invention comprise the action of maintaining the trencher in a fixed position while placing a station in a trench. Because the trencher separate from the installation tool after release, it may be maintained in a fixed position even though the installation tool itself may move and continue the flexible body deployment.

The main advantages of the installation tool and method according to the invention are that the risk for flexible body damage due to movements of the flexible body and entanglement is reduced. The uncertainties with respect to the position and conditions at the TDP at dynamic conditions are also reduced. By maintaining a large pulldown force in the flexible body using a tensioner it is possible to avoid loss of control of the flexible body position even in strong sea currents without compromising the conditions at the TDP.

BRIEF DESCRIPTION OF THE DRAWINGS

The installation tool and the method for installing a flexible body according to the invention will now be described in more detail with regard to the accompanying drawings. The drawings show one way of implementing the present invention and is not to be construed as being limiting to other possible embodiments falling within the scope of the attached claim set.

DETAILED DESCRIPTION OF AN EMBODIMENT

Figure 1:
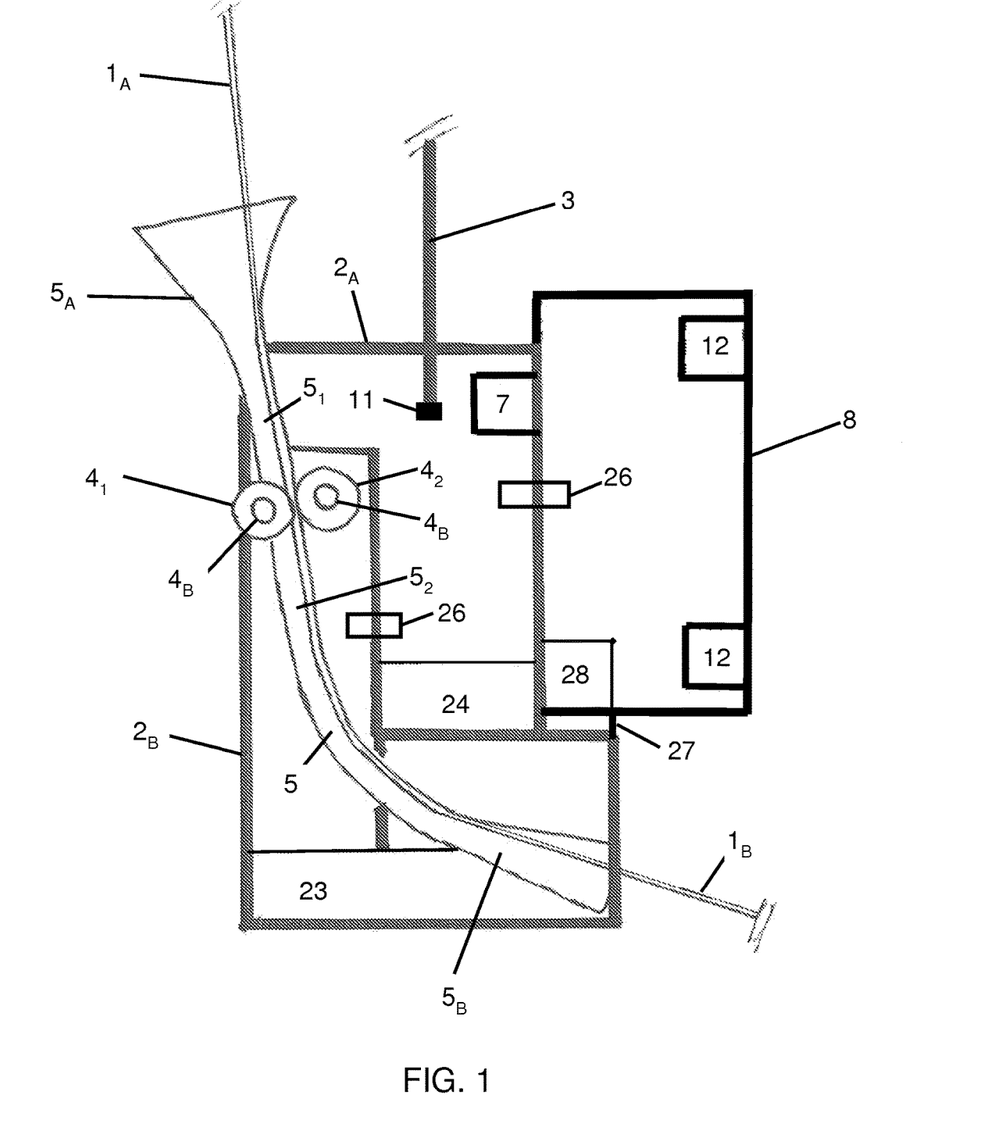
FIG. 1 is a cross-sectional view of an example embodiment of the installation tool according to the invention.

FIG. 1 illustrates schematically the installation tool of the invention that enables a pulldown of the flexible body to be installed. The flexible body $1_{A,B}$, such as for example a subsea fibre optic cable is coupled, for example by clamping, to an installation tool and controlled by a tensioner $4_{1-2,A-B}$ in the tool. The flexible body $1_{A,B}$ is to be installed on the seabed 17 from a surface vessel 16 as indicated on FIG. 4. The installation tool is suspended from the vessel 16 using an umbilical 3. The installation tool initially has a weight sufficient to create a significant tension in the umbilical 3. The weight of the installation tool is mainly formed by a main body 2 possibly with additional loads 23, 24. By pulling down the cable $1_{A,B}$ the tension in an upper part of the cable increases, thus making the upper section $1_A$ of the cable more resistant towards shifts in position due to drag effects caused by (varying) sea currents, tidal effects, etc.

The tensioner $4_{1-2,A-B}$ may be coupled to the cable $1_{A,B}$ so as to be able to actively pull the cable $1_{A,B}$ down in a manner controlled by the tensioner using for example wheels or a caterpillar element to adjust the cable tension. The tension in a first, upper section $1_A$ of the cable from the installation vessel 16 to the installation tool 2 is made large to eliminate drag effects and still keep the cable tension low in a second, bottom section $1_B$ of the cable from the installation tool 2 to a cable touchdown position TDP on the seabed 17.

The installation tool represents an improvement as compared to the known prior art in that the tensioner $4_{1-2,A-B}$ the installation tool enables an increase of the tension in the mainly vertical section of the cable $1_{A,B}$, while simultaneously ensuring a low back tension. The term back tension refers to the tension in the second, bottom section $1_B$ of the cable running towards the seabed. The weight of the installation tool may be in the range 5-15 tons. The tensioner $4_{1-2,A-B}$ may tighten the cable $1_{A,B}$, typically by shifting about 1-2 tons of the weight of the installation tool from the umbilical to the cable $1_{A,B}$, thereby obtaining a large tension in the first, upper section $1_A$ of the cable. The large tension in this first part of the cable effectively reduces effects of drag and sea currents on the catenary. At the same time a low back tension is achieved, typically in the area of about 1-200 kg, in the second section $1_B$ of the cable going to the sea bottom. The speed of the vessel and a Linear Cable Engine (LCE) must be synchronised to keep the back tension low. The installation tool 2 and the TDP may this way both be kept closer to a vertical line than in the known prior art solutions where a high tension is applied over the cable $1_{A,B}$ as a whole, i.e. over the full length of the cable, where a high back tension tends to pull the cable away from a vertical line. The tension in the cable $1_{A,B}$, the weight of the installation tool 2 and the height of the installation tool above the sea bottom can be adjusted to minimize the expected drag effects and to optimize cable tension.

The use of a tensioner $4_{1-2,A-B}$ is fairly simple and reliable when mounted in the installation tool as described in this disclosure because the installation tool automatically follows/synchronizes with the movements of the vessel 16. As an alternative placement one might consider mounting the tensioner $4_{1-2,A-B}$ in front of a separate ROV. However, this will increase the risks associated with the relative movements between the surface vessel and the ROV at the sea bottom. Installation using a wave compensating crane could reduce this problem somewhat however, it will require a more complex installation line on the vessel to compensate for the relative movements between the crane and the LCE.

The tensioner $4_{1-2,A-B}$ may comprise wheels $4_N$ (N=1, 2) or a caterpillar structure for clamping onto the cable $1_{A,B}$, and to tension the cable. A set of one or more wheels $4_N$ that are clampable onto the cable $1_{A,B}$ is shown in FIG. 1. The wheels $4_N$ may be run by electric or hydraulic motors $4_B$ that are usually synchronized by torque. The tensioner $4_{1-2,A-B}$ controls the tension in the cable $1_{A,B}$ using the electric and/or hydraulic motors $4_{A,B}$. The desired value of cable tension is typically set by operators or a main control system on the vessel 16, and communicated from the vessel to the installation tool via the umbilical 3. The installation tool comprises a tension control loop for maintaining the tension in the cable at or close to the desired value. The tension control loop includes the motors $4_{A,B}$ and a suitable cable tension sensing element for monitoring the tension in the cable. The tensioner $4_{1-2,A-B}$ may be suspended in the installation tool 2 so that the vertical and horizontal forces may be measured by suitable cable tension sensors connected to the control unit 16 via the umbilical 3.

Figure 2:
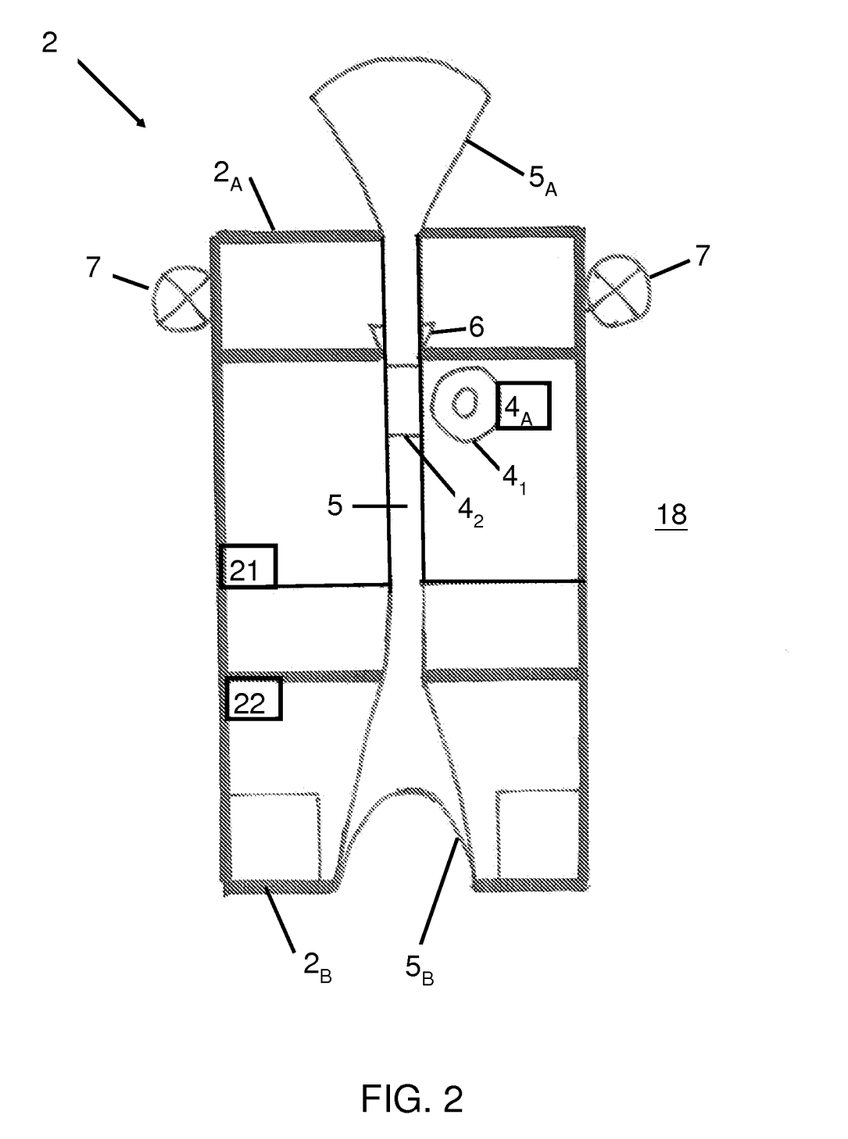
FIG. 2 is a front view of the installation tool according to the invention showing the tensioner when "opened" for flexible body release/entry subsea.

The tensioner $4_{1-2,A-B}$ may be opened so the installation tool can engage or release the cable $1_{A,B}$ also when deployed in a subsea environment 18. At least one of the wheels $4_N$ is movably mounted in the installation tool 2, so as to be able to open up space, e.g. a slot, through which the cable $1_{A,B}$ may be entered into or removed from the installation tool. Advantageously, such a slot provides an opening from the chute 5 and to a front F and a bottom B of the installation tool, thereby coupling the interior of the chute 5 with the surroundings 18, and so that a near vertical cable $1_{A,B}$ in a subsea position can be conveniently engaged or released by the installation tool. For this purpose, at least one of the wheels $4_N$ can be mounted on a tilting arm, a pivot arm, or a rotatable structure, to be able to move a wheel away from its normal operating position to a free position, to allow unhindered movement of the cable through the slot-shaped opening and into the chute. When the cable $1_{A,B}$ is near the inner wheel $4_2$, the outer wheel $4_1$ is moved back to its normal operating position to clamp the cable and also to close the slot. In order to close and open the installation tool for entering or removing the cable there may also be provided a movable element, e.g. a movable wall of the chute 5, that may be moved between two positions, a first closed position and a second open position, for control of the opening and closing of the chute 5 and the space for entering or removing the cable from the installation tool.

For allowing a station on a cable $1_{A,B}$ to pass the wheels $4_N$, the position of one or more of the wheels $4_N$ are controlled by a hydraulic pressure device or alternatively a controlled spring device being a part of or mounted on the tilting arm, the pivot arm, or the rotatable structure and provided with a suitable control mechanism for maintaining a constant clamp pressure for a varying diameter of the cable, as will be the case for a cable with stations.

To ensure smooth movement of the cable $1_{A,B}$ and possible associated sensor station $1_C$ through the installation tool it is required that the width of the chute 5 has to be at least as large as the diameter of sensor stations $1_C$ along the cable $1_{A,B}$ so as to allow the sensor stations to slide comfortably through the chute 5. Further, it is desirable that the cable is guided along a straight path when passing the wheels $4_N$ of the tensioner $4_{1-2,A-B}$. For this purpose the chute 5 may include straight chute sections $5_{1,2}$ on either side of the wheels $4_N$ to align the cable $1_{A,B}$ and the sensor stations $1_C$ and minimize the risk of cable damage when the cable station enters or leaves the wheels $4_N$. The cable $1_{A,B}$ and stations have to move between the wheels and there should not be spaces allowing the cable/stations to be pushed to a side of the wheels. The straight chute sections $5_{1,2}$ are dimensioned so as to be able to accommodate the sensor stations $1_C$.

A first chute opening $5_A$ facing in the direction towards the vessel 16 will typically be wider than a second chute opening $5_B$ facing in the direction of the TDP, in order to accommodate the larger cable fluctuations expected in the first section $1_A$ of the cable due to waves and fluctuations in sea currents before the tension is generated during operation of the tensioner $4_{1-2,A-B}$. Some width of the first chute opening $5_A$ may also be advantageous in that it simplifies the "picking" operation where the cable is taken into the chute 5 and before the installation tool clamps onto the cable $1_{A,B}$ to hold the cable in a controlled position using the cable guiding means $4_{1-2,A-B}$.

The installation tool may bring the end of the cable $1_{A,B}$ to be installed from the vessel 16 and down to the seabed 17 during lowering. In an alternative the installation tool may grab a cable $1_{A,B}$ at a subsea location, provided the cable has a vertical part which the installation tool may couple to. Such a cable $1_{A,B}$ could be lowered by a separate load or by another installation unit. The installation tool may then be guided towards the cable $1_{A,B}$ by the umbilical 3 and the vessel 16. The installation tool may also be equipped with thrusters 7 for improved control of the detailed subsea maneuvering as far as the umbilical 3 allows. The installation tool can "fly" towards the cable $1_{A,B}$, enter the cable in the chute 5, and grab the cable by moving one or more of the wheels $4_N$ of the tensioner $4_{1-2,A-B}$, as illustrated in FIG. 2. The cable $1_{A,B}$ may also be guided in between the wheels $4_N$ of the tensioner $4_{1-2,A-B}$ and via a slot provided in parallel with the chute 5 from the chute 5 and to a side face S of the installation tool. The slot only requires a width 2-3 times the diameter of the cable itself. Opening/closing of the slot may be achieved by moving/rotating the sidewall of the chute. In this case the required movement of the clamping wheels $4_N$ is simplified as it will now only necessary to move the wheels $4_N$ away from each other so as to allow entry of the cable between the wheels.

During operation the installation unit is coupled to the installing vessel 16 by the umbilical 3. First power and signal transmission means including transmission lines are integrated in the umbilical 3 ensures delivery of power and communication to the installation tool.

There is no need for further vertical lines than the umbilical 3 and the cable $1_{A,B}$ to be installed, thus minimizing the risk of entanglement of the vertical lines. The lower end of the umbilical 3 may be clamped to a stiff steel messenger 11 on the installation tool. The steel messenger could be arranged to rotate around a pivot point. If the pivot point includes a torque motor the tilt of the installation tool can be optimised for catching the cable $1_{A,B}$ and for other operations.

The tensioner $4_{1\text{-}2,A\text{-}B}$ and the thrusters 7 are supplied with power and control signals via first power and communication means being an integrated part of the umbilical 3. The installation tool may also be provided with navigation units as well as camera and lighting equipment. Such equipment may be accommodated in sealed modules 21,22, for example in the upper part $2_A$ of the installation tool, and/or in a free space provided above a bottom load 23 in a lower part $2_B$ of the installation tool. When referring to upper $2_A$ and lower $2_B$ parts of the installation tool in the context of this application the word upper and lower refer to the relative positions of the first $2_A$ and second parts $2_B$ of the installation tool when suspended in its operative state.

The second chute opening $5_B$ at the bottom of the installation tool may be narrower than the first chute opening $5_A$, because the direction of the cable $1_{A,B}$ is defined by the TDP. A certain width is required in the second chute opening $5_B$ due to the same reasons as for the first chute opening $5_A$. In addition there will be some vertical cable movements due to the waves lifting the vessel 16 and the installation tool, thereby changing the cable catenary and touchdown position periodically.

The weight of the installation tool must be adjusted so as to handle the level of sea currents to be expected, the drag effects on both the cable 1 to be installed as well as the umbilical 3, and the vertical tension in the cable $1_{A,B}$. The overall weight can be divided between the upper and lower parts $2_{A,B}$ of the installation tool. The lower part $2_B$ could carry a bottom load 23, and the upper part $2_B$ may have an upper load 24. The loads 23, 24 could be formed as solid metal or cement blocks, so as to form a large weight in the installation tool.

Figure 3:
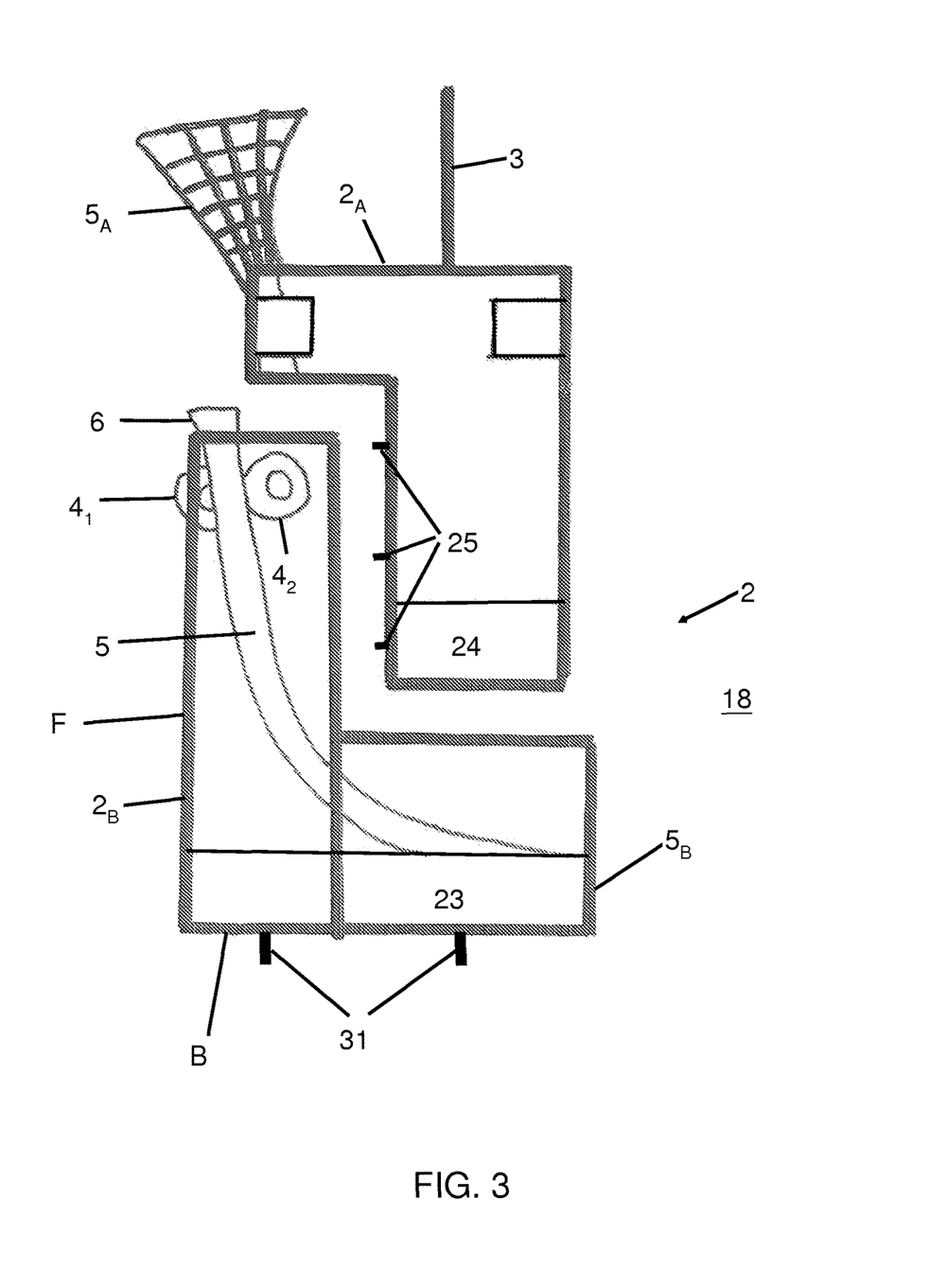
FIG. 3 illustrates the separation of the first (upper) and second (bottom) parts of the installation tool for carrying out special operations.

The installation tool can be manufactured so that the upper and lower parts $2_{A,B}$ may be split apart during operation. The lower part $2_B$ of the installation tool may be placed at the sea bottom and released and used as an anchor to maintain the tension in the cable $1_{A,B}$ to be installed. If the installation tool is to carry out other operations during installation of the cable $1_{A,B}$, the lower part $2_B$ of the installation tool may be clamped to the cable $1_{A,B}$ and located on the sea bottom 17.

The upper part $2_A$ of the installation tool may as explained above be released and has an operating range defined by the risk for entanglement between the cable to be installed and the umbilical. The installation tool may then also be retrieved separately, and the upper and lower parts $2_{A,B}$ may be re-coupled subsea by use of guide pins, Hydraulically activated guide pins 25 will lock the upper and lower parts $2_{A,B}$ together. To allow for separation the installation should have wet mate connectors/stab plates 26.

During such a separating operation the lower part $2_B$ must include a gripping mechanism for holding the cable $1_{A,B}$. The gripping mechanism can be the tensioner $4_{1\text{-}2,A\text{-}B}$ itself which is already adapted to grip the cable $1_{A,B}$. A hydraulic tensioner may grip for some time by use of accumulators.

Anchoring for a long time may require more permanent locking pins activated by hydraulic or electric actuators. The locking pins will be activated when the upper and lower parts $2_{A,B}$ of the installation tool are decoupled and the tensioner does not have energy available (fail-safe concepts).

The lower part $2_B$ of the installation tool can include one or more spears 31, as illustrated on FIG. 3, to be injected or pushed into the seabed for more stable and fixed location. Alternatively or in addition the lower part $2_B$ may also include cross bars or mud hats at the bottom to get a stable operation depending on the soil conditions. The first, wide, chute opening $5_A$ follows the upper part $2_A$ of the installation tool when split to remove the drag forces resulting from that part of the chute 5, by moving it away from the lower part $2_B$ of the installation tool. Only a minor chute 6 is required to ensure a reliable operation when the lower part $2_B$ is on the seabed with a clamped cable $1_{A,B}$. This minor chute 6 will be outside of the lower end of the top chute $5_A$ when the upper and lower parts $2_{A,B}$ of the installation tool are coupled together.

When deploying a seismic cable $1_{A,B}$ with seismic stations $1_C$, it may be required to trench the stations to some degree for improving the acoustic coupling to the ground and/or for protection purposes. The trencher may be provided with handling means $8_A$ adapted for applying a pressing/pushing or wiggling of the seismic station into the seabed.

In some situations it may only be the seismic stations that must be trenched. Such a "point" trenching" leaves more time for the trenching while the installation tool continues installation of the part of cable $1_{A,B}$ between stations. The trencher 8 must, however, keep up with the installation tool operation to be ready for the trenching of the next station.

The trencher 8 can be clamped onto the installation tool during deployment and retrieval as seen on FIG. 1. There may be a separate trencher locking mechanism 26 on the installation tool or the trencher can have manipulators to perform this function. The installation tool may include a hinged docking base 27 to rotate the trencher from horizontal to vertical during installation and retrieval. This will reduce the overall drag forces. The trencher 8 can include a reel 28 for the required trencher umbilical 9 from the installation tool to the trencher 8. The reel 28 will control the length of umbilical required for each operation/positioning of the trencher 8.

The main structural parts of the installation tool can be produced from steel bars to reduce the overall drag effects. Even the top chute $5_A$ can be made from steel tubing to reduce drag. Pressure vessels for instrumentation etc will be located so as to add a minimum of additional drag.

The trencher umbilical 9 forms a part of second power transmission and communication means for supplying power to the trencher 8 and for communicating with devices and units on the trencher, e.g. from the surface vessel via the installation tool. The trencher may also include other means known to a person skilled in the art for assisting in moving around and performing its operations, such as e.g. trencher thrusters 12, a camera, lighting equipment, and/or navigation devices 12. The installation tool umbilical 3 may be designed to have capacity for supplying other units with power and signal capacity. Wet mate connectors may be implemented on suitable locations for mating subsea. The trencher 8 may be connected to the upper part $2_A$ or the lower part $2_B$ of the installation tool, or both in parallel. In this way it can be chosen whether the trencher 8 is going with the upper part $2_A$ of the installation tool to carry out other operations or land close to the parked lower part $2_B$ while the upper part $2_A$ is carrying out another operation.

The installation tool may be towed without the product (the tensioner $4_{1-2,A-B}$ and the trencher 8) at higher speeds for pre-surveying and post-surveying operations. It is for this reason most useful to have surveying instruments mounted on the upper part $2_A$ of the installation tool.

The installation tool can include a manipulator arm to operate subsea shackles, mate connectors, remove items etc. The arm may be useful for repair operations. It can be used to locate and inspect a failed part, either directly or by use of an attached ROV. The installation tool or an ROV can handle cable cutting tools and cable grippers. Installation tool may also be provided with equipment for coupling the cable end to e.g. a hub at the seabed. The installation tool can assist during installation of the loop of excess cable usually required in a cable repair.

Figure 4:
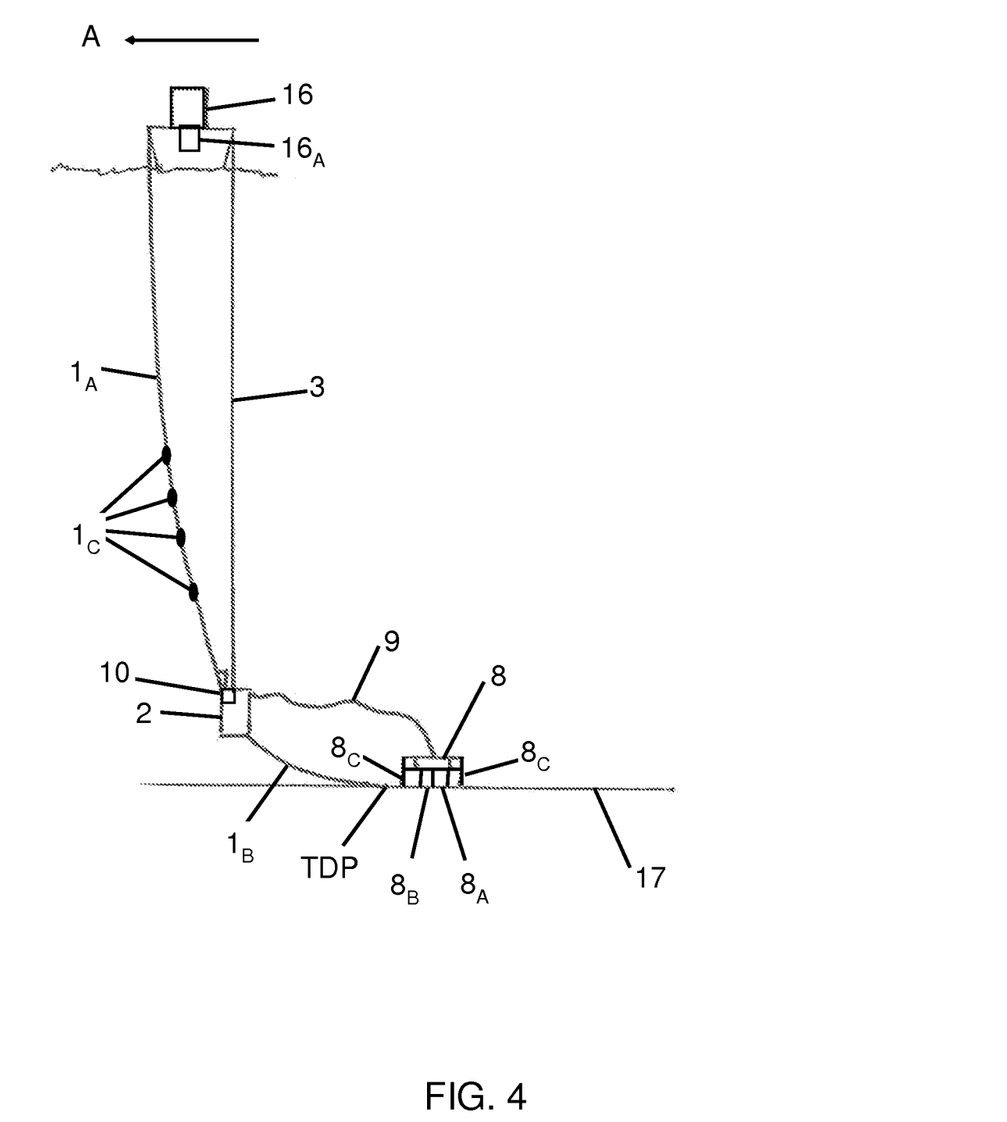
FIG. 4 illustrates an example embodiment of a method according to the invention, i.e. an installation operation making use of the installation tool according to the invention.

FIG. 4 is a sketch of a typical application of the installation tool according to first aspect of the present invention. FIG. 4 also illustrates a method according to the second aspect of the present invention for installing a flexible body, such as a subsea optical fibre cable, at a sea bed location by guiding the body during deployment or retrieval with an installation tool according to the first aspect of the invention.

An installation vessel 16 is placed on the sea surface almost straight above the point of installation. Then the umbilical 3 with the installation tool at the end is lowered into the sea. From a separate position on the deck of the vessel 16 a cable $1_{A,B}$ is also lowered into the sea. The umbilical 3 with the installation tool will deploy in a generally vertical direction down towards the bottom and keep the installation tool about 10-20 meters above the seabed 17. The high weight of the umbilical 3 and the weight of the installation tool keep the umbilical 3 in an almost vertical line even in strong sea currents. The umbilical is heavy due to the required strength and all armouring (steel cables). The cable $1_{A,B}$ to be installed is almost parallel to the umbilical but will usually have more curved catenary due to drag effects. The detailed shape of the catenary of the cable $1_{A,B}$ will depend on the cable design, sea current, and the pull down tension from the tensioner $4_{1-2,A-B}$ in the installation device when this is set in operation.

The umbilical 3 and the cable $1_{A,B}$ may be deployed from opposite sides of the vessel 16 to increase their separation. This will reduce the risk of entanglement. The curve followed by the cable $1_{A,B}$ will bulge in the direction of the sea current.

The vessel 16 may be rotated to a position that will maximize the separation between the cable $1_{A,B}$ and the umbilical 3. In order to reduce vertical movement due to the sea waves, the cable $1_{A,B}$ and umbilical 3 may be deployed from the centre of the vessel 16. A trencher 8 may be a fixed part of the installation tool during deployment and retrieval of the installation tool. The vessel typically moves sideways during installation, as indicated by the arrow A in FIG. 4.

Following the lowering of the umbilical 3 and the cable $1_{A,B}$ the installation tool is moved so that the cable $1_{A,B}$ enters the tensioner, to be clamped in position by the wheels $4_N$ or a caterpillar element of the tensioner $4_{1-2,A-B}$. Then the tensioner is activated to pull down the cable so as to create a high tension (typically in the range of 1-2 tons) in the first part $1_A$ of the cable $1_{A,B}$. A low tension (typically in the range of 1-200 kg) in the second part $1_B$ of the cable $1_{A,B}$ can be achieved by proper position of the vessel with respect to the TDP.

The catenary of the cable $1_{A,B}$ will touch down on the seabed at a certain distance behind the installation tool. The touchdown position (TDP) is fairly close (typically 100m) to the vessel due to the weight of the cable, the low cable tension and the high height of the installation tool.

After touchdown the trencher 8 can start trenching of the sensor stations only or alternatively the whole cable. If the whole cable is trenched the trencher 8 must move along the cable with the speed of the vessel in a continuous manner.

Alternatively, if only the stations are to be trenched, there is more time for the trenching at each station. The trencher 8 can maintain its position at a station for some time to do the trenching while the vessel continues installation at a constant speed, and when finished trenching one station the trencher 8 can catch up with the vessel by moving swiftly to the next trenching position (the next station). In other words, the trencher 8 is maintained in position while placing a station in a trench. In such a "point" trenching scenario more attention must be paid to the trencher umbilical to avoid this from getting snagged.

The operating range of the trencher 8 is defined by the length of the trencher umbilical. However, it will be obvious to a person skilled in the art when reading this disclosure that the handling of the trencher umbilical from the installation tool is simpler than having another umbilical down from the vessel 16 that could possibly tangle with the other vertical lines. In applications in deep waters the distance between the lines (umbilical/cables) is almost negligible compared to the depth (20-50 m separation for a depth of 1-2000 m).

In summary, there is provided subsea installation tool for installing a flexible body, e.g. a subsea fibre cable $1_{A,B}$ on a seabed from a surface vessel, and an associated method for installing the flexible body on the seabed is provided. The installation tool includes a tensioner $4_{1-2,A-B}$ that may be coupled to the flexible body $1_{A,B}$ to actively pull it down, thus increasing tension in the flexible body in an upper section $1_A$ of the cable from the installation vessel 16 to the installation tool. High tension in the upper part of the cable gives good control even in strong sea currents. At the same time the tensioner enables lower tension in the flexible body in the bottom part cable from the installation tool to the seabed, giving good control of the touchdown position on the seabed.

The overall performance of a subsea cable deployment will not depend on the installation tool alone, as the overall performance will depend on the cooperative effort of the vessel, the installation tool and the monitoring, control and communication system tying the various components together so as to handle the cable, the umbilical and the installation tool during varying conditions of the sea and the sea bed.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for installing a flexible body on a sea bed from a surface vessel, the method comprising:
deploying a subsea installation tool configured to install the flexible body on the sea bed, the subsea installation tool comprising:
a main body configured to be suspended from the surface vessel using an umbilical, the main body having a mass and density sufficient to create a downward force in the umbilical;
a flexible body guiding element coupled to the main body;
a tensioner configured to be coupled to the flexible body and configured to actively pull down the flexible body, in a controlled manner, to make the tension in an almost vertical first section of the flexible body from the surface vessel to the subsea installation tool larger than the tension in a second section of the flexible body from the subsea installation tool to a touchdown position (TDP) of the flexible body on the sea bed; and
a tension control loop configured to maintain the tension in the almost vertical first section of the flexible body at or near a given value based on a control signal received from a controller on the surface vessel, wherein the tension control loop comprises a flexible body tension sensing element configured to monitor the tension in the almost vertical first section of the flexible body based on measurement of vertical and horizontal forces, wherein the tensioner is configured to support measurement of the vertical and horizontal forces by the flexible body tension sensing element based on suspension of the tensioner in the subsea installation tool for supporting measurement of the vertical and horizontal forces by cable tension sensors communicatively connected to the controller on the surface vessel; and
controlling the tensioner, based on the tension control loop, to make the tension in the almost vertical first section of the flexible body from the surface vessel to the subsea installation tool larger than the tension in the second section of the flexible body from the subsea installation tool to the TDP of the flexible body on the sea bed.

2. A subsea installation system, comprising:
a subsea installation tool configured to install a flexible body on a sea bed from a surface vessel, the subsea installation tool comprising:
a main body configured to be suspended from the surface vessel using an umbilical, the main body having a mass and density sufficient to create a downward force in the umbilical;
a flexible body guiding element coupled to the main body;
a tensioner configured to be coupled to the flexible body and configured to actively pull down the flexible body, in a controlled manner, to make the tension in an almost vertical first section of the flexible body from the surface vessel to the subsea installation tool larger than the tension in a second section of the flexible body from the subsea installation tool to a touchdown position (TDP) of the flexible body on the sea bed; and
a tension control loop configured to maintain the tension in the almost vertical first section of the flexible body at or near a given value based on a control signal received from a controller on the surface vessel, wherein the tension control loop comprises a flexible body tension sensing element configured to monitor the tension in the almost vertical first section of the flexible body based on measurement of vertical and horizontal forces, wherein the tensioner is configured to support measurement of the vertical and horizontal forces by the flexible body tension sensing element based on suspension of the tensioner in the subsea installation tool for supporting measurement of the vertical and horizontal forces by cable tension sensors communicatively connected to the controller on the surface vessel.

3. The subsea installation system of claim 2, wherein the tensioner is configured to be communicatively connected to the controller on the surface vessel via first power transmission and communication means, wherein the controller is configured to control the tension in the flexible body.

4. The subsea installation system of claim 2, wherein the tensioner comprises one or more wheels, wherein the subsea installation tool is further configured to move one or more wheels along a generally linear trajectory to thereby create an opening in the tensioner, the opening being dimensioned to the diameter of the flexible body for moving the flexible body into or out of at least one of the tensioner or the flexible body guiding element.

5. The subsea installation system of claim 2, wherein the tensioner comprises one or more wheels, wherein the subsea installation tool further comprises a rotation means for moving the one or more wheels in a generally circular trajectory to thereby create an opening along the flexible body guiding element in the tensioner, the opening being dimensioned to the diameter of the flexible body for moving the flexible body into or out of the tensioner.

6. The subsea installation system of claim 2, wherein the subsea installation tool comprises a closable slot in parallel with and coupled to the flexible body guiding element to thereby allow the flexible body to be moved into or out of the tensioner.

7. The subsea installation system of claim 2, wherein the subsea installation tool comprises a releasable part configured to be released to the sea bed to act as an anchor for the flexible body to be installed.

8. The subsea installation system of claim 7, wherein the releasable part comprises a gripping mechanism configured to grip the flexible body.

9. The subsea installation system of claim 8, wherein the gripping mechanism is a clamp device.

10. The subsea installation system of claim 8, wherein the gripping mechanism is a part of or all of the tensioner.

11. The subsea installation system of claim 7, wherein the subsea installation tool further comprises one or more elements configured to increase stability when deploying the releasable part to the sea bed, the one or more elements selected from the group consisting of one or more spears, one or more cross bars, and one or more mud plates.

12. The subsea installation system of claim 2, further comprising:
a trencher releasably coupled to the main body of the subsea installation tool.

13. The subsea installation system of claim 12, wherein the subsea installation tool further comprises:
trencher power transmission means configured to supply power to the trencher; and
trencher communication means configured to support communications of the trencher.

14. The subsea installation system of claim 2, wherein the main body comprises one or more loads giving a total tension in the umbilical that is several times more than the tension pulling down the flexible body.

15. A subsea installation tool configured to install a flexible body on a sea bed, comprising:
a main body configured to be suspended from a surface vessel using an umbilical, the main body configured to have a mass and density sufficient to create a downward force in the umbilical;
a flexible body guiding element coupled to the main body and configured to guide the flexible body;
a tensioner configured to be coupled to the flexible body and configured to actively pull down the flexible body, wherein a tension in an almost vertical first section of the flexible body from the surface vessel to the subsea installation tool can, in a controlled manner, be made larger than a tension in a second section of the flexible body from the subsea installation tool to a touchdown position (TDP) of the flexible body on the sea bed; and
a tension control loop configured to maintain the tension in the almost vertical first section of the flexible body at or near a given value based on a control signal received from a controller on the surface vessel, wherein the tension control loop comprises a flexible body tension sensing element configured to monitor the tension in the almost vertical first section of the flexible body based on measurement of a force vertical and horizontal forces, wherein the tensioner is configured to support measurement of the vertical and horizontal forces by the flexible body tension sensing element based on suspension of the tensioner in the subsea installation tool for supporting measurement of the vertical and horizontal forces by cable tension sensors communicatively connected to the controller on the surface vessel.

16. The subsea installation tool of claim 15, wherein the main body is configured to give a tension in the umbilical that is greater than the tension in the almost vertical first section of the flexible body to thereby enable the subsea installation tool to remain suspended from the umbilical while a portion of the tension in the umbilical is shifted to the flexible body.

17. The subsea installation tool of claim 15, wherein the tensioner is configured to actively pull down the flexible body by shifting a portion of the weight of the main body from the umbilical to the flexible body.

18. The subsea installation tool of claim 15, wherein the tension control loop comprises:
a set of motors configured to adjust the tension in the almost vertical first section of the flexible body.

19. The subsea installation tool of claim 15, wherein the flexible body tension sensing element is connected to the controller via the umbilical.

* * * * *